ELECTRONIC COMMUTATOR

Filed Oct. 4, 1957 2 Sheets-Sheet 1

INVENTORS
LEO M. AUDRETSCH
KELLY B. DAY
BY Edwin Lester
ATTORNEY

Oct. 4, 1960 L. M. AUDRETSCH ET AL 2,955,254

ELECTRONIC COMMUTATOR

Filed Oct. 4, 1957 2 Sheets-Sheet 2

United States Patent Office 2,955,254

Patented Oct. 4, 1960

2,955,254

ELECTRONIC COMMUTATOR

Leo M. Audretsch, Poughkeepsie, and Kelly B. Day, Jr., Wappingers Falls, N.Y., assignors to International Business Machines Corporation, New York, N.Y., a corporation of New York Filed Oct. 4, 1957, Ser. No. 688,236

13 Claims. (Cl. 328—106)

Figure 1A:
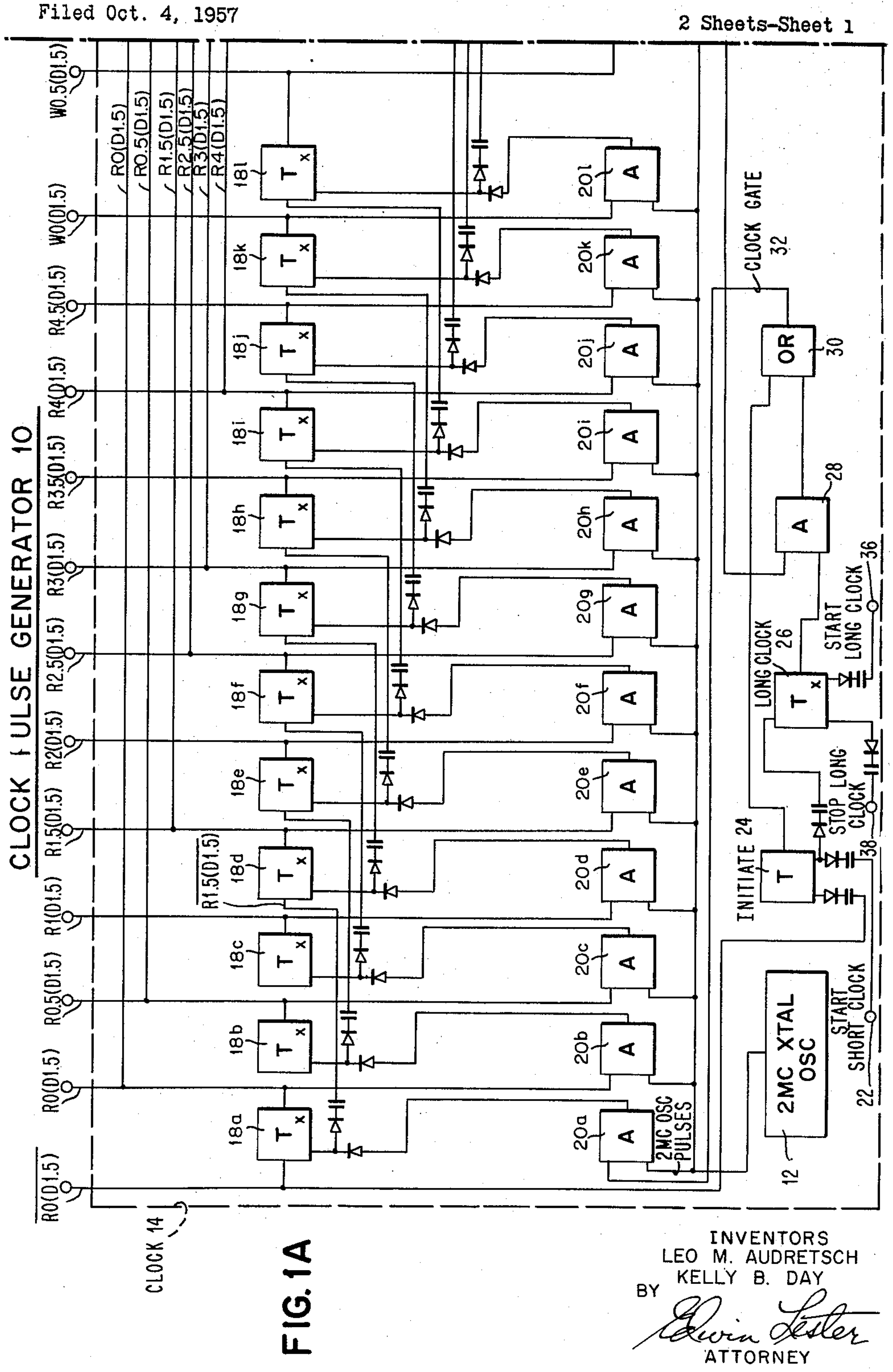

This invention relates to commutators and more particularly to electronic commutators producing a series of pulses having a predetermined relation to each other.

Electronic commutators have, in the past, consisted of a plurality of bistable devices connected together by switching circuits to form a ring of bistable devices with each bistable device of the ring having an On state and an Off state. A signal source is provided for applying a succession of pulses to the ring. Initially, all of the bistable devices of the ring may be reset to the Off state and the switching circuit associated with the first bistable device of the ring is then externally conditioned to apply a pulse from the source to switch the first bistable device of the ring from the Off state to the On state or initially the first bistable device of the ring may be reset to the On state while the remainder of the bistable devices of the ring may be reset to the Off state. In either event, the first bistable device of the ring in being turned On conditions the switching circuit associated with the next succeeding bistable device of the ring to pass the next pulse from the source to switch Off the first bistable device of the ring and to switch On the next succeeding bistable device of the ring. In a similar manner, each succeeding pulse applied to the ring of bistable devices causes the bistable device that is presently in the On state to be switched to the Off state and the succeeding bistable device to be switched to the On state so that the On state effectively steps from bistable device to bistable device of the ring. Accordingly, a succession of accurately timed pulses is produced by the ring with each pulse having a period starting when a bistable device of the ring is turned On and ending when the next succeeding bistable device is turned On. With this arrangement, the trailing edge of a pulse occurs simultaneously in time with the leading edge of the next succeeding pulse. However, it is often desirable to avoid the simultaneous occurrence of the trailing edge of one pulse with the leading edge of the next succeeding pulse. This may be accomplished by overlapping successive pulses but would require additional circuitry to that described above to accomplish this result.

Also, the pulse generator, of the type described above, may be arranged so that the last bistable device in the ring is connected back to the first bistable device to form a closed ring whereby the pulse generator, once externally started, is free running until externally stopped. The pulse generator may also be arranged as an open ring whereby the last bistable device of the ring is not connected back to the first bistable device so that once cycled the pulse generator will not recycle unless externally signalled. Obviously, connections must be logically changed in order to operate a ring of bistable devices as an open or closed ring.

Accordingly, an object of this invention is to provide an improved electronic commutator.

Another object of the invention is to provide a novel pulse generator for generating a succession of accurately timed overlapping pulses.

Still another object of the invention is the provision of a pulse generator which may be selectively single cycled or recycled.

A further object of the invention is to provide variable length pulses.

A still further object of the invention is to provide a modified ring type of commutator wherein a switching of a bistable device causes a switching of a preceding bistable device other than the next preceding device.

In accordance with the present invention, a pulse generator is provided comprising a plurality of stages each of which includes a bistable device having a first and second state of stability and a switching circuit, means for conditioning the switching circuit in each stage in accordance with a predetermined state of the associated bistable device, means for simultaneously applying an input signal to all of said switching circuits, each switching circuit when conditioned being effective to apply the input signal to switch the state of the bistable device of the next succeeding stage, and means connecting the bistable device of each stage starting with a predetermined stage to the bistable device of a preceding stage other than the next preceding stage so that when the bistable device of each stage starting with said predetermined stage switches its state of stability the bistable device of said preceding stage switches its state of stability.

Other objects of the invention will be pointed out in the following description and claims and illustrated in the accompanying drawings, which disclose by way of example, the principle of the invention and the best mode, which has been contemplated, of applying that principle.

Figure 1B:
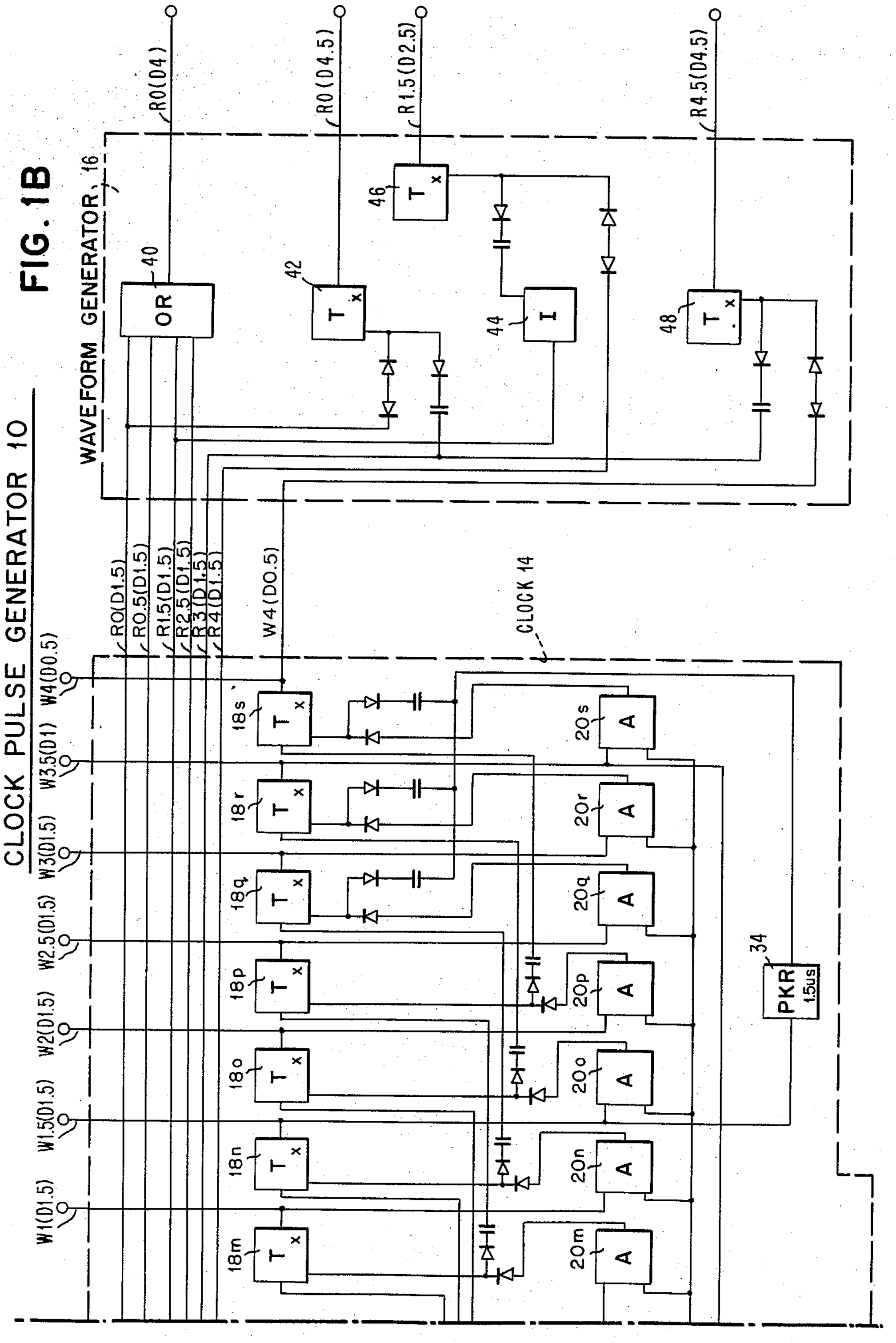

In the drawings:

Figs. 1A and 1B taken together show the novel pulse generator of the present invention.

Referring now to Figs. 1A and 1B there is shown in block form the pulse generator 10, the main function of which is to establish accurately timed clock pulses.

The pulse generator 10 is composed of a clock 14 and a waveform generator 16. The clock 14 includes a crystal controlled oscillator 12, of known type, which generates a signal at a basic frequency of 2 megacycles (mc.) so that the smallest subdivision or basic period of time is 0.5 microsecond and a gating arrangement, that is, means for conditioning the clock 14 to be driven by the 2 mc. oscillator 12. The clock 14 also includes a ring of nineteen triggers 18 which, being driven by the 2 mc. oscillator 12, has a 9 microsecond basic cycle of operation consisting of a 5 microsecond read portion, during which time information may be read out of a memory and a 4 microsecond write portion, during which time information may be written into the memory.

The various clock pulses generated by the clock 14 have maximum periods of 1.5 microseconds, as will be explained hereinafter. However, various circuits in data processing machines require pulses having periods which are greater than 1.5 microseconds. Consequently, the waveform generator 16 mixes various clock pulses generated by the clock 14 to produce the extended period pulses required by the various circuits of these machines.

Before proceeding with a detailed description of the pulse generator 10, an explanation of the various reference characters and pulse notations to be used is now given.

The reference characters R and W are hereinafter referred to as clock pulses corresponding to the read portion and write portion, respectively, of the clock cycle of operation. A number added as a suffix to the reference characters R or W, for example R0 or W1, is hereinafter referred to as an index point in the clock cycle, with each index point corresponding to the leading edge of a clock pulse. Thus, the starting point or initial index-point in each portion of the clock cycle is designated as R0 and W0, with each succeeding index point being separated from the preceding index point by the basic period of time, namely, 0.5 microseconds. Thus, a clock cycle is provided as follows, R0, R0.5, R1, R1.5, R2, R2.5, R3, R3.5, R4, R4.5, W0, W0.5, W1, W1.5, W2, W2.5, W3, W3.5, W4 with a 5 microsecond read portion and a 4 microsecond write portion.

Additionally, a designation is added identifying the duration of the clock pulse, comprising the reference character D and a number representing the period of time in microseconds. For example, a clock pulse which occurs 3 index points after initiation of the write portion of the clock cycle and which has a duration of one and a half microseconds is designated as W1.5(D1.5). Likewise, a pulse which is produced by the waveform generator 16 is initiated at a particular index point in the clock cycle and has a particular duration dependent upon the clock pulses which are mixed in the waveform generator 16. Consequently, a pulse generater by the waveform generator 16 will be identified by the index point at which it is initiated and a designation identifying the duration of the pulse, as for example, R0(D4).

The clock pulses generated by the pulse generator 10 are produced by triggers. Therefore, the left-hand output of a clock pulse trigger will be designated by a bar over the reference character identifying the clock pulse, as for example, $\overline{\text{R0(D1.5)}}$, while the right-hand output of a clock clock pulse trigger will be distinguished from the left-hand output by the absence of a bar over the reference character, as for example, R0(D1.5). It should be kept in mind that these designations identify the left and right-hand output of a clock pulse trigger regardless of the state of the trigger. Therefore, when the clock pulse trigger is in the On state a relatively negative signal is maintained at the left-hand output while a relatively positive signal is maintained at the right-hand output whereas, when the clock pulse trigger is in the Off state the previous conditions of the clock pulse trigger outputs are reversed, that is, a relatively positive signal is maintained at the left-hand output while a relatively negative signal is maintained at the right-hand output.

The oscillator 12 applies pulses at a 0.5 microsecond rate to one input of each of the AND circuits 20. However, since none of the triggers 18 are in the On state, none of their associated AND circuits 20 are conditioned to allow any of the pulses from the oscillator 12 through to operate the ring of triggers 18.

Now, let it be assumed that a short clock operation is to be performed, that is, the clock 14 is to go through a single cycle of operation and then stop. Consequently, all of the triggers 18 are first reset, by means not shown, so that the right-hand tube of each trigger 18 is in a conductive state as indicated by the letter "X" in the lower right-hand corner of each trigger block representation. Next, a negative shift of potential is applied to the start short clock terminal 22 which passes via negative shift input circuit to turn On the Initiate trigger 24. The Initiate trigger 24 in being turned On applies a positive signal from its right-hand output via the OR circuit 30 to the clock gate line 32 where it is applied to condition the AND circuit 20*a*. Therefore, the next pulse from the oscillator 12 passes via the now conditioned AND circuit 20*a* to set the R0 trigger 18*a* to its On state causing a relatively positive shift of potential to be applied to the R0(D1.5) line and causing a relatively negative shift of potential to be applied to the $\overline{\text{R0(D1.5)}}$ line. The negative shift potential on the $\overline{\text{R0(D1.5)}}$ line is effective to reset the Initiate trigger 24 which, in being reset, applies a negative signal from its right-hand output via the OR circuit 30 to bring down the clock gate line 32 to decondition AND circuit 20*a* and prevent any further recycling of the clock 14. At the same time, the positive signal on the R0(D1.5) line conditions the next succeeding AND circuit 20*b* so that the next succeeding pulse from the oscillator 12 passes via the now conditoned AND circuit 20*b* to set the R0.5 trigger 18*b* to its On state causing a positive signal to be applied to the R0.5(D1.5) line. The positive signal on the R0.5(D1.5) line conditions the next succeeding AND circuit 20*c* so that the next succeeding pulse from the oscillator 12 passes via the now conditioned AND circuit 20*c* to set the R1 trigger 18*c* to its On state causing a positive signal to be applied to the R1(D1.5) line.

At this point, triggers 18*a*, 18*b* and 18*c* are concurrently On and the positive signal on the R1(D1.5) line is applied to condition the AND circuit 20*d*. Hence, the next succeeding pulse from the oscillator 12 passes via the now conditioned AND circuit 20*d* to set the R1.5 trigger 18*d* to its On state causing a positive signal to be applied to the R1.5(D1.5) line and causing a negative signal to be applied to the R1.5(D1.5) line. The negative signal on the $\overline{\text{R1.5(D1.5)}}$ line is fed back via a negative shift input circuit to turn Off the R0 trigger 18*a* while the positive signal on the R1.5(D1.5) line is applied to condition the next succeeding AND circuit 20*d*. Since the R1.5 trigger 18*d* is turned On 1.5 microseconds after the R0 trigger 18*a* is turned On, a positive signal is maintained on the R0(D1.5) line and a negative signal is maintained on the $\overline{\text{R0(D1.5)}}$ line for 1.5 microseconds as indicated by the symbols. Likewise, in a similar fashion, each of the succeeding triggers 18*c* to 18*s* in being turned On causes the third preceding trigger to be turned Off, as for example, turning On the R2 trigger 18*e* causes the R0.5 trigger 18*b* to be turned Off, turning On the R2.5 trigger 18*f* causes the R1 trigger 18*c* to be turned Off . . . turning On the W4 trigger 18*s* causes the W2.5 trigger 18*p* to be turned Off so that each clock pulse up to and including W2.5 will have a period of 1.5 microseconds.

At W3 time, the W1.5 trigger 18*n* is reset causing a negative shift of potential to be applied via the W1.5-(D1.5) line to the peaker 34. Peaker 34 may be any of well known type which responds to a negative shift of potential to produce a positive output pulse having a very short duration, the period of which is indicated by the figure in the lower right-hand corner of the block representation. Hence, the peaker 34 responds to the negative shift of potential on the W1.5(D1.5) line to produce a positive pulse having a period of 1.5 microseconds so that, at W4.5 time, the trailing edge of the positive pulse is applied to reset the W3, W3.5 and W4 triggers 18*q*, 18*r* and 18*s*, respectively. Since the W3 trigger 18*q* is turned On at W3 time and turned Off at W4.5 time, a positive pulse is maintained on the W3(D1.5) line for 1.5 microseconds, as indicated by its symbol. Likewise, since the W3.5 trigger 18*r* is turned On at W3.5 time and turned Off at W4.5 time, a positive pulse is maintained on the W3.5(D1) line for 1.0 microsecond, as indicated by its symbol. Also, since the W4 trigger 18*s* is turned On at W4 time and turned Off at W4.5 time, a positive pulse is maintained on the W4(D0.5) line is up for 0.5 microseconds, as indicated by its symbol.

At this point, all of the triggers 18 are in their Off state, all of the AND circuits 20 are deconditioned and the clock 14 has completed the single cycle of operation.

If it were desired to operate the clock 14 for more than one cycle of operation, then, the Long Clock trigger 26 is utilized. Thus, a negative shift of potential is applied to the start long clock terminal 36 which passes via a negative shift input circuit to turn On the Long Clock trigger 26. The Long Clock trigger 26 in being turned On applies a positive shift of potential from its right-hand output to condition the AND circuit 28 and negative shift of potential from its left-hand tapped output via a negative shift input circuit to turn On the Initiate trigger 24. The Initiate trigger 24 is being turned On applies a positive signal from its right-hand output via the OR circuit 30 to bring up the clock gate line 32, as in the short clock operation, to condition the AND circuit 20*a* to pass the next succeeding pulse from the oscillator 12 to turn On the R0 trigger 18*a*. The R0 trigger 18*a*, in being turned On, again, as before, applies a negative shift of potential via the $\overline{R0(D1.5)}$ line to turn Off the Initiate trigger 24 which, is being turned Off, causes a negative signal to be applied from its right-hand output via the OR circuit 30 to the clock gate line 32. The negative signal on the clock gate line 32 is effective to decondition the AND circuit 20*a*.

From this point on, the clock 14 operates in the same manner as previously described. However, when the W3.5 trigger 18*r* is turned On, it applies a positive signal via the W3.5(D1.0) line to the AND circuit 28. The AND circuit 28 is still conditioned due to the fact that the Long Clock trigger 26 is still in the On state. Consequently, the positive signal passes via the conditioned AND circuit 28 and the OR circuit 30 and is applied to the clock gate line 32 to condition the AND circuit 20*a* for a period from W3.5 time to W4.5 time so that the next succeeding pulse from the oscillator 12 occurring at W4 time is effective to turn On the R0 trigger 18*a* to initiate another cycle of operation of the clock 14. It will be readily apparent that W4 time and R0 time are coincident in time. The positive signal on the W3.5(D1) line is also applied to condition the AND circuit 20*s*. Consequently, when the next succeeding pulse is applied from the oscillator 12, at W4 time, to turn On the R0 trigger 18*a*, it is also applied via the conditioned AND circuit 20*s* to turn On the W4 trigger 18*s* causing a positive signal to be applied to the W4(D0.5) line. Following this, at W4.5 time, as previously explained, the positive pulse output of the peaker 34 is terminated causing a negative shift of potential to be applied to turn Off the triggers 18*q*, 18*r* and 18*s* and the clock then continues to cycle in the manner as previously described. So long as the Long Clock trigger 26 remains On, the AND circuit 28 remains conditioned to permit recycling of the clock 14. When it is desired to stop the recycling of the clock 14, a negative shift of potential is applied to the stop long clock terminal 38 where it passes via negative shift input circuit to turn Off the Long Clock trigger 26. Ahe Long Clock trigger 26 in being turned Off applies a negative signal from its right-hand output to decondition the AND circuit 28. Consequently, the present cycle of the clock 14 will continue and, at W3.5 time, when a positive signal is applied to the W3.5(D1) line, it will be blocked from passing through the deconditioned AND circuit 28 to the clock gate line 32. Hence, a negative signal is maintained on the clock gate line 32 to decondition the AND circuit 20*a* so that when the next succeeding pulse is applied from the oscillator 12, at W4(R0) time, it is blocked from passing via the deconditioned AND circuit 20*a* to turn On the R0 trigger 18*a*. The clock 14 then runs out its present cycle of operation and will not recycle until such time as it is again externally signalled.

Referring now to Fig. 1B, there is shown the details of the waveform generator 16.

The clock pulses on the R0(D1.5), R0.5(D1.5), R1.5(D1.5) and R2.5(D1.5) lines are sequentially applied to the OR circuit 40 and since they overlap one another, in time, the output from the OR circuit 40 will come up at the time the first mentioned clock pulse comes up, namely at R0 time, and will stay up until the time the last mentioned clock pulse comes down, namely at R4 time, thereby bringing up the R0(D4) line, starting at R0 time, for a period of 4 microseconds.

At R0 time, the positive shift of the leading edge of the clock pulse on the R0(D1.5) line is also applied to turn On the trigger 42 which, in being turned On, applies a positive signal from its right-hand output to bring up the R0(D4.5) lines. Subsequently, at R4.5 time, the negative shift of the trailing edge of the clock pulse on the R3(D1.5) line is applied to turn Off the trigger 42 which, in being turned Off, applies a negative signal from its right-hand output to bring down the R0(D4.5) line. Thus, it should be apparent, that the R0(D4.5) line is brought up starting at R0 time for a period of 4.5 microseconds.

At R1.5 time, the positive shift of the leading edge of the clock pulse on the R1.5(D1.5) line is applied to the inverter 44 where it is inverted to a negative shift potential and applied to turn On the trigger 46 which, in being turned On, applies a positive signal from its right-hand output to bring up the R1.5(D2.5) line. Subsequently, at R4 time, the positive shift of the leading edge of the clock pulse on the R4(D1.5) line is applied to turn Off the trigger 46 which, in being turned Off, applies a negative signal from its right-hand output to bring down the R1.5(D2.5) line. Thus, it should be apparent, that the R1.5(D2.5) line is brought up starting at R1.5 time for a period of 2.5 microseconds.

At R4.5 time, the negative shift of the trailing edge of the clock pulse on the R3(D1.5) line is applied to turn On the trigger 48 which, in being turned On, applies a positive signal from its right-hand output to bring up the R4.5(D4.5) line. Subsequently, at W4(R0) time, the positive shift of the leading edge of the clock pulse on the W4(D0.5) line is applied to turn Off the trigger 48 which, in being turned Off, applies a negative signal from its right-hand output to bring down the R4.5(D4.5) line. Hence, the R4.5(D4.5) line is brought up starting at R4.5 time for a period of 4.5 microseconds.

Thus, there has been described herein a novel and improved pulse generator for generating a succession of accurately timed overlapping pulses and, in addition, pulses of variable length as is necessary. Also, it should be apparent that without making physical changes, the improved pulse generator may be selectively single cycled or recycled. With this feature the pulse generator of the present invention may be operated free running or it may be externally synchronized with another system.

Throughout the detailed description of the pulse generator no reference was made to cathode followers. It should be obvious that the characteristics of these passive elements vary and are largely determined by component load and the coupling between components. Therefore, in a specific construction of the device in accordance with the principles of the present invention, cathode followers may be used wherever and in any manner that is deemed necessary, as for example, by connecting them to the outputs of the triggers 18 of the pulse generator 10.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A timing device comprising a plurality of stages each of which includes a bistable device having a first and second state of stability and a switching circuit, means for conditioning the switching circuit in each stage in accordance with a predetermined state of the bistable device in the next preceding stage, means for simultaneously applying an input signal to all of said switching circuits, each switching circuit when conditioned being effective to apply the input signal to switch the state of the associated bistable device and initiate production of an output signal, and means connecting each stage starting with a predetermined stage to a preceding stage other than the next preceding stage so that when the bistable device of each stage starting with said predetermined stage switches its state of stability the bistable device of said preceding stage switches its state of stability and terminates production of an output signal therefrom whereby successive overlapping output signals are produced.

2. A pulse generator comprising a plurality of stages each of which includes a bistable device having a first and second state of stability and a switching circuit, means for conditioning the switching circuit in each stage in accordance with a predetermined state of the bistable device in the next preceding stage, means for simultaneously applying an input signal to all of said switching circuits, each switching circuit when conditioned being effective to apply the input signal to switch the state of the associated bistable device and initiate production of an output signal, and means connecting the bistable device of each stage starting with a predetermined stage to the bistable device of a preceding stage other than the next preceding stage so that when the bistable device of each stage starting with said predetermined stage switches its state of stability the bistable device of said preceding stage switches its state of stability and terminates production of an output signal therefrom whereby successive overlapping output signals are produced.

3. A pulse generator comprising a plurality of stages each of which includes a bistable device having a first and second state of stability and a switching circuit, means for conditioning the switching circuit in each stage when the bistable device in the next preceding stage is in the second state of stability, means for simultaneously applying an input signal to all of said switching circuits, each switching circuit when conditioned being effective to apply the input signal to switch the associated bistable device from the first state of stability and initiate production of an output signal to the second state of stability, and means connecting the bistable device of each stage starting with a predetermined stage to the bistable device of a preceding stage other than the next preceding stage so that when the bistable device of each stage starting with said predetermined stage switches from the first state of stability to the second state of stability the bistable device of said preceding stage switches from the second state of stability to the first state of stability and terminates production of an output signal therefrom whereby successive overlapping output signals are produced.

4. A pulse generator comprising a plurality of stages each of which includes a trigger having a first and second state of stability and an AND circuit, means for conditioning the AND circuit in each stage in accordance with a predetermined state of the trigger in the next preceding stage, means for simultaneously applying an input signal to all of said AND circuits, each AND circuit when conditioned being effective to apply the input signal to switch the state of the associated trigger and initiate production of an output signal and means connecting the trigger of each stage starting with a predetermined stage to the trigger of a preceding stage other than the next preceding stage so that when the trigger of each stage starting with said predetermined stage switches its state of stability the trigger of said preceding stage switches its state of stability and terminates production of an output signal therefrom whereby successive overlapping output signals are produced.

5. A timing device comprising a plurality of stages each of which includes a bistable device having a first and second state of stability and a switching circuit for applying a signal to switch the state of the bistable device of the next succeeding stage and initiate production of an output signal, means for simultaneously applying an input signal to all of said switching circuits, means connecting each switching circuit with its associated bistable device to permit said switching circuit to pass the input signal only when said associated bistable device is in a predetermined state of stability, and means connecting each stage starting with a predetermined stage to a preceding stage other than the next preceding stage so that the bistable device of said preceding stage switches its state of stability and terminates production of an output signal therefrom when the bistable device of each stage starting with the predetermined stage switches its state of stability whereby successive overlapping output signals are produced.

6. An electronic commutator comprising a plurality of stages each of which includes a bistable device having a first and second state of stability and a switching circuit, means for conditioning the switching circuit in each stage in accordance with a predetermined state of the bistable device in the next preceding stage, means for simultaneously applying an input signal to all of said switching circuits, each switching circuit when conditioned being effective to apply the input signal to switch the state of the associated bistable device, means connecting each stage starting with a predetermined stage to a preceding stage other than the next preceding stage so that when the bistable device of each stage starting with said predetermined stage switches its state of stability the bistable device of said preceding stage switches its state of stability, and means coupled to predetermined ones of said stages for selectively controlling said electronic commutator to perform a single cycle of operation or repeated cycles of operation.

7. A single cycle electronic commutator comprising a plurality of stages each of which includes a bistable device having a first and second state of stability and a switching circuit, means for conditioning the switching circuit in each stage in accordance with a predetermined state of the bistable device in the next preceding stage, control means for conditioning the switching circuit in the first stage, means for simultaneously applying an input signal to all of said switching circuits, each switching circuit when conditioned being effective to apply the input signal to switch the state of the associated bistable device, means connecting the bistable device of each stage starting with a predetermined stage to the bistable device of a preceding stage other than the next preceding stage so that when the bistable device of each stage starting with said predetermined stage switches its state of stability the bistable device of said preceding stage switches its state of stability, and means responsive to a switching of the bistable device of said first stage for causing said control means to decondition the switching circuit in said first stage to prevent a recycle of operation of said electronic commutator.

8. A single cycle electronic commutator comprising a plurality of stages each of which includes a bistable device having a first and second state of stability and a switching circuit, means for conditioning the switching circuit in each stage in accordance with a predetermined state of the bistable device in the next preceding stage, an initiate bistable device having a first and second state of stability, means for conditioning the switching circuit in the first stage in accordance with a predetermined state of said initiate bistable device, means for simultaneously applying an input signal to all of said switching circuits, each switching circuit when conditioned being effective to apply the input signal to switch the state of the associated bistable device, means connecting the bistable device of each stage starting with a predetermined stage to the bistable device of a preceding stage other than the next preceding stage so that when the bistable device of each stage starting with said predetermined stage switches its state of stability the bistable device of said preceding stage switches its state of stability, and means connecting the bistable device of said first stage to the initiate bistable device so that when the bistable device of said first stage switches its state of stability said initiate bistable device switches its state of stability causing said second mentioned conditioning means to decondition the switching circuit in said first stage to prevent a recycle of operation of said electronic commutator.

9. An electronic commutator comprising a plurality of stages each of which includes a bistable device having a first and second state of stability and a switching circuit, means for conditioning the switching circuit in each stage in accordance with a predetermined state of the bistable device in the next preceding stage, control means for conditioning the switching circuit in the first stage, means for simultaneously applying an input signal to all of said switching circuits, each switching circuit when conditioned being effective to apply the input signal to switch the state of the associated bistable device and initiate production of an output signal, means connecting the bistable device of each stage starting with a predetermined stage to the bistable device of a preceding stage other than the next preceding stage so that when the bistable device of each stage starting with said predetermined stage switches its state of stability the bistable device of said preceding stage switches its state of stability and terminates production of an output signal thereupon, and means responsive to a switching of the bistable device of a predetermined stage for causing said control means to condition the switching circuit in said first stage to permit a recycle of operation of said electronic commutator whereby successive overlapping output signals are produced.

10. An electronic commutator comprising a plurality of stages each of which includes a bistable device having a first and second state of stability and a switching circuit, means for conditioning the switching circuit in each stage in accordance with a predetermined state of the bistable device in the next preceding stage, first control means for conditioning the switching circuit in the first stage, second control means for conditioning the switching circuit in the first stage, means for simultaneously applying an input signal to all of said switching circuits, each switching circuit when conditioned being effective to apply the input signal to switch the state of the associated bistable device, means connecting the bistable device of each stage starting with a predetermined stage to the bistable device of a preceding stage other than the next preceding stage so that when the bistable device of each stage starting with said predetermined stage switches its state of stability the bistable device of said preceding stage switches its state of stability, means responsive to a switching of the bistable device of said first stage for causing said first control means to decondition the switching circuit in said first stage, and means responsive to a switching of the bistable device of a predetermined stage for rendering said second control means effective to permit a recycle of operation of said electronic commutator.

11. A pulse generator comprising a plurality of stages each of which includes a bistable device having a first and second state of stability and a switching circuit, each bistable device having an output terminal, means for conditioning the switching circuit in each stage when the bistable device in the next preceding stage is in the second state of stability, means for simultaneously applying an input signal to all of said switching circuits, each switching circuit when conditioned being effective to apply the input signal to switch the associated bistable device from the first state of stability to the second state of stability causing a signal to be produced at the output terminal thereof, and means connecting the bistable device of each stage starting with a predetermined stage to the bistable device of a preceding stage other than the next preceding stage so that when the bistable device of each stage starting with said predetermined stage switches from the first state of stability to the second state of stability the bistable device of said preceding stage switches from the second state of stability to the first state of stability causing said signal produced at the output terminal thereof to be terminated whereby successive overlapping output signals are produced.

12. A commutator comprising a plurality of stages each having a first and second input terminal and an output terminal, means connecting the output terminal of each stage to the first input terminal of the succeeding stage, means for simultaneously applying a succession of input signals to the second input terminal of all of said stages each input signal causing an output signal to be produced at a successive one of said output terminals, and means connecting each stage starting with a predetermined stage to a preceding stage other than the next preceding stage for terminating the signal produced at the output terminal of said preceding stage when a signal is produced at the output terminal of said each stage so that successive overlapping output signals are produced.

13. A commutator comprising a plurality of stages each having a first and second input terminal and an output terminal, means connecting the output terminal of each stage to the first input terminal of the succeeding stage, means for simultaneously applying a succession of input signals to the second input terminal of all of said stages each input signal causing an output signal to be produced at a successive one of said output terminals, means connecting each stage starting with a predetermined stage to a preceding stage other than the next preceding stage for terminating the signal produced at the output terminal of said preceding stage when a signal is produced at the output terminal of said each stage so that a succession of overlapping output signals is produced at the output terminals of said stages, each output pulse being of equal duration, and control means responsive to various ones of said output signals for producing variable length output signals.

References Cited in the file of this patent

UNITED STATES PATENTS

| | | |
|---|---|---|
| 2,306,386 | Hollywood | Dec. 29, 1942 |
| 2,644,887 | Wolfe | July 7, 1953 |
| 2,690,507 | Woods-Hill et al. | Sept. 28, 1954 |

OTHER REFERENCES

Electronic Engineering, March 1957, pages 136—139, "The Junction Transistor as a Computing Element," by E. Wolfendale.

UNITED STATES PATENT OFFICE

CERTIFICATE OF CORRECTION

Patent No. 2,955,254 October 4, 1960

Leo M. Audretsch et al.

It is hereby certified that error appears in the printed specification of the above numbered patent requiring correction and that the said Letters Patent should read as corrected below.

Column 5, line 42, for "Ahe" read -- The --; column 7, line 33, strike out "and initiate production of an output signal", and insert the same after "stability" and before the comma in line 34, same column 7; column 9, line 19, for "thereupon" read -- therefrom --.

Signed and sealed this 11th day of April 1961.

(SEAL)
Attest:

ERNEST W. SWIDER
Attesting Officer

ARTHUR W. CROCKER
Acting Commissioner of Patents